UNITED STATES PATENT OFFICE.

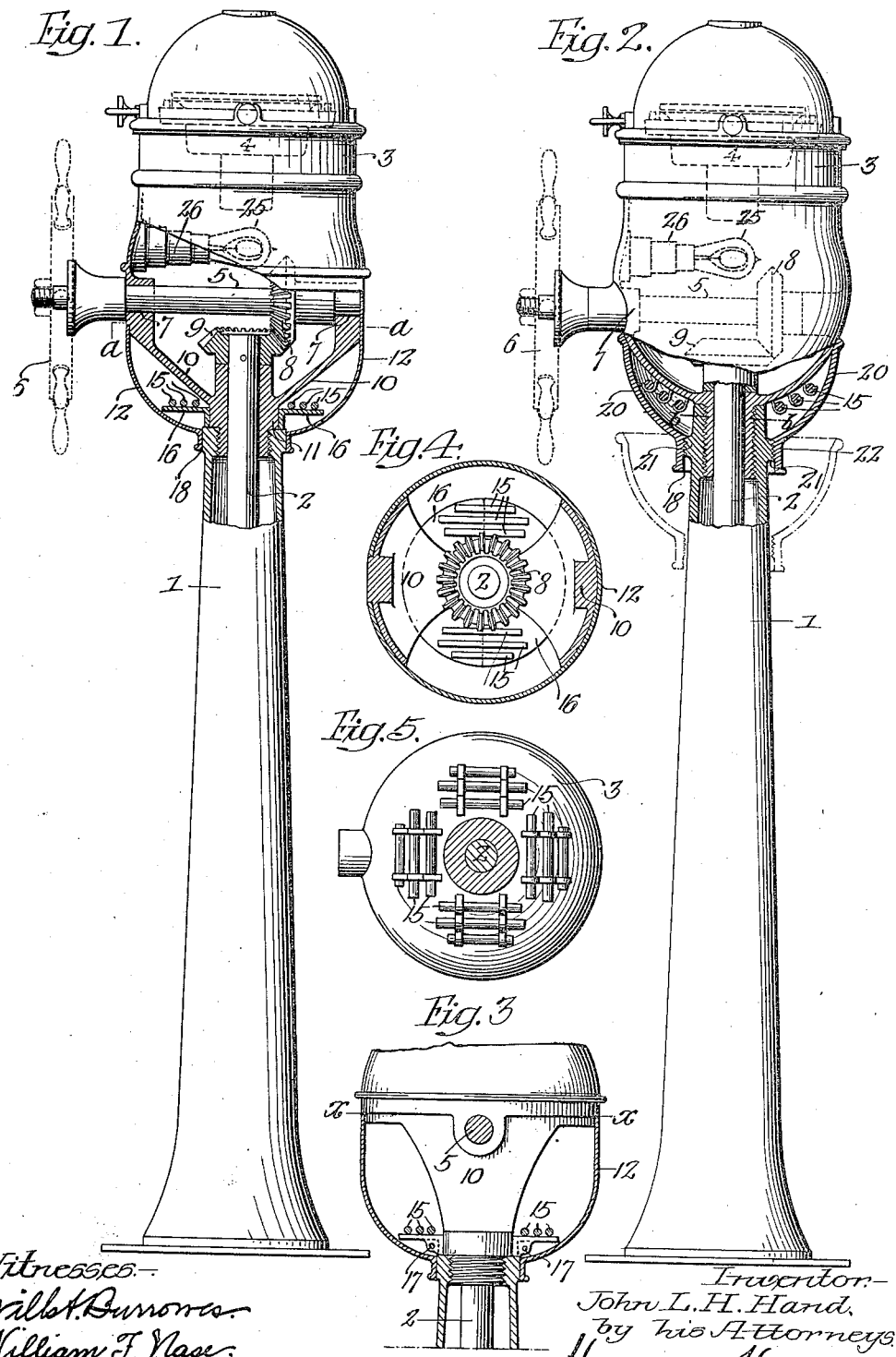

JOHN L. H. HAND, OF ATCO, NEW JERSEY.

NAVIGATION INSTRUMENT.

1,083,091.      Specification of Letters Patent.      Patented Dec. 30, 1913.

Application filed April 11, 1912. Serial No. 690,123.

*To all whom it may concern:*

Be it known that I, JOHN L. H. HAND, a citizen of the United States, and a resident of Atco, Camden county, New Jersey, have invented certain Improvements in Navigation Instruments, of which the following is a specification.

My invention relates to supporting stands for ships' compasses and the like; and the object of my invention is to provide an improved form of steering pedestal binnacle having supporting and housing means for magnetic elements employed with such structures to effect and insure proper compensation of compass deviations.

A further object of my invention is to provide a structure in which the gearing between the wheel shaft or spindle and the transmitting shaft may be readily examined; to provide means for the placement of an illuminating element for the compass, and to provide a construction permitting ready access to the interior of the compass casing for the repair or replacement of these several elements and the compensating devices.

These and other features of my invention are more fully described hereinafter, reference being had to the accompanying drawings, in which:

Figure 1, is an elevation, partly in section, illustrating one form of structure within the scope of my invention; Fig. 2, is a similar view illustrating another form of structure within the scope of my invention; Fig. 3, is an elevation, partly in section, of the structure shown in Fig. 1, at right angles to the same; Fig. 4, is a plan view partly in section on the line $a-a$, Fig. 1, and Fig. 5, is an inverted plan view partly in section on the line $b-b$, Fig. 2.

The proper compensation of a compass in an iron vessel may require all of the following appliances: Permanent magnets for correcting "semi-circular deviations". Soft iron spheres placed at right angle to keel line, with centers on plane of compass magnets, for correcting "quadrantal deviations". A soft iron bar, (so-called Flinders bar) or series of rods placed vertically in keel line, forward or aft of compass, with top end slightly above plane of compass magnets, for correcting deviations caused by induced magnetism in vertical soft iron. Permanent magnet placed vertically under center of compass, for correcting deviations due to heeling of vessel. In every case where compensation is necessary, the permanent magnets for correcting the semi-circular deviations are used, and occasionally some one or all of the other correctors are necessary.

In the drawings, 1 represents the post or standard of a steering pedestal binnacle, housing a substantially vertical shaft 2, and supporting a casing 3, in which a compass 4 is mounted in any usual or well known manner. Within the casing is the usual shaft or spindle 5, to which a hand wheel 6, (shown by dotted lines,) may be attached; such casing carrying the necessary bearings 7 for such shaft or spindle, and the latter having a bevel pinion 8 meshing with a bevel pinion 9 carried by the shaft 2, whereby motion imparted to the shaft or spindle 5 by the wheel 6, may be transmitted to said shaft 2. All of this is of ordinary construction.

As usually made, the compass casing 3 is continuous, extending under the shaft and gearing and being suitably connected or secured to the pedestal or standard. Such construction is somewhat objectionable, however, since it requires removal of the compass from the casing to permit examination of the gearing or to fix magnetic elements in place to insure proper compensation of the compass deviations. These magnetic elements, which may be of various characters, usually, however, in the form of rods or bars, should be placed within the shell, generally below the shaft 5 mounted in the same, and in order to gain access thereto for any desired purpose with structures now in use, it is necesssary to remove the compass and effect such adjustment from above, with the further discomfort of having the shaft 5, in the way. While the magnets may be mounted exteriorly of the compass casing, it is desirable that they be inclosed, and to overcome the objections noted, the lower part of the casing is removed at or about the line $x-x$ and a bracket 10, integral with the casing or suitably connected thereto, is attached to the pedestal 1. This bracket provides the bearings 7 for the shaft or spindle 5, and carries a collar or hub 11 which may be secured in any suitable manner, preferably by a threaded connection, to the pedestal 1. To inclose the parts, a supplemental shell 12 is provided, cut out to fit over the forward bearing for the shaft; the bracket having a surface at this point lying flush with the outer surface of the supplemental shell 12 and the latter may be held in place by any suitable means. With this construction, dropping of the shell 12 permits access to the gearing for any purpose, and the magnetic compensating elements, some of which, indicated at 15, may be carried by a plate 16 mounted on the hub 11, may be placed or adjusted, as may be desired. This may be split and secured together by bolts 17 as indicated in Fig. 3.

When it is desired to examine the magnetic elements for the purpose of adjustment or replacement, the supplemental shell or cover 12 may be dropped by releasing the fastening means for the same, and when lowered, it will be supported by the post or standard 1 which gradually flares outwardly from the top to the bottom. Preferably the cover has a smooth inner wall 18 at its lowest point in order that the outer wall or surface of the post or standard will not be marred when such cover is lowered to permit inspection and adjustment of the magnetic or other elements within the casing.

In the form of structure shown in Fig. 1, the under cover or protective housing for the magnetic elements conforms to the contour of the casing so that when the parts are in place, the effect of the structure is the same as in ordinary structures of this type.

In some instances, it may be desirable to provide a special housing or cover for inclosing magnetic compensating elements supported below and exteriorly of a casing of ordinary construction, as in the structure illustrated in Fig. 2. In such case, the pedestal binnacle structure may be provided with an additional housing element 20 disposed below the main casing and contacting with the same at or substantially at the point of contact of the supplemental housing cover illustrated in Fig. 1. This structure may be supported in a slightly different manner from that shown in Fig 1; the standard or post 1 being shown as having a threaded flange 21 to which a threaded collar 22 carried by the cover 20 is adapted; the main casing being threaded into said standard in the usual manner.

The several plan views, Figs. 4 and 5, indicate one manner of supporting the magnetic elements with respect to the rest of the structure.

In order to effect illumination of the compass at night, the casing may be provided with an electric light 25, carried by a socket 26 and so disposed as to have its point of greatest illuminating value directly beneath the compass. The wiring connections for such light are carried through the pedestal thereof.

I claim:

1. In a steering pedestal binnacle, the combination of a supporting standard, a compass carried thereby, a casing inclosing the same, a series of magnetic compensating elements disposed beneath said compass and supported by the casing, and a detachable housing or cover for inclosing said magnetic elements.

2. In a steering pedestal binnacle, the combination of a supporting standard, a casing carried thereby, a compass within said casing, magnetic compensating elements disposed beneath said compass, supports for said magnetic elements, a detachable housing or cover for inclosing the same, and means for supporting said detachable housing or cover.

3. The combination of a steering pedestal, a compass, corrector appliances for the proper compensation of the compass located below the same, and a detachable housing for such appliances, the latter being accessible independent of the compass or its mounting.

In testimony whereof, I have signed my name to this specification in the presence of two subscribing witnesses.

JOHN L. H. HAND.

Witnesses:
 Wm. H. Flint,
 J. B. Allen.

Copies of this patent may be obtained for five cents each, by addressing the "Commissioner of Patents, Washington, D. C."